US010145401B2

(12) United States Patent
Snoeyink et al.

(10) Patent No.: US 10,145,401 B2
(45) Date of Patent: Dec. 4, 2018

(54) CLIP FOR A VEHICLE DOOR ASSEMBLY

(71) Applicant: Ford Global Technologies, LLC, Dearborn, MI (US)

(72) Inventors: Diane Carole Snoeyink, Ann Arbor, MI (US); Aleksandar Spasovski, Canton, MI (US); Linh Doan, Belleville, MI (US); John Pinkerton, Canton, MI (US); Bhavani Thota, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 9 days.

(21) Appl. No.: 15/416,783

(22) Filed: Jan. 26, 2017

(65) Prior Publication Data

US 2018/0209457 A1  Jul. 26, 2018

(51) Int. Cl.
*F16B 5/06* (2006.01)
*B60R 13/04* (2006.01)
*B60J 5/04* (2006.01)
*B60J 1/08* (2006.01)
*B60R 13/02* (2006.01)

(52) U.S. Cl.
CPC ............. *F16B 5/065* (2013.01); *B60J 5/04* (2013.01); *B60R 13/04* (2013.01); *B60J 1/08* (2013.01); *B60J 5/0401* (2013.01); *B60J 5/042* (2013.01); *B60J 5/0411* (2013.01); *B60J 5/0412* (2013.01); *B60J 5/0481* (2013.01); *B60J 5/0483* (2013.01); *B60R 13/0243* (2013.01)

(58) Field of Classification Search
CPC .. F16B 5/065; B60J 5/04; B60J 5/0412; B60J 5/0481; B60J 5/0411; B60J 5/042; B60J 5/0483; B60J 5/0401; B60J 1/08; B60R 13/04; B60R 13/0243
USPC .......................................................... 296/147
See application file for complete search history.

(56) References Cited

U.S. PATENT DOCUMENTS

| | | | |
|---|---|---|---|
| 6,141,837 A | 11/2000 | Wisniewski | |
| 8,733,820 B2 | 5/2014 | Vemulapati et al. | |
| 8,925,988 B2 | 1/2015 | Lee et al. | |
| 9,302,631 B2 | 4/2016 | Lee | |
| 2013/0181475 A1* | 7/2013 | Torii | B60J 5/0413 296/146.7 |
| 2014/0165362 A1* | 6/2014 | Lee | B60R 13/0206 29/428 |

* cited by examiner

*Primary Examiner* — D Glenn Dayoan
*Assistant Examiner* — Dana D Ivey
(74) *Attorney, Agent, or Firm* — Vichit Chea; Brooks Kushman P.C.

(57) ABSTRACT

A vehicle door assembly includes a door and a trim panel. The trim panel has a mount defining an aperture with a main portion and a keyway. A clip of the assembly includes a base connected to the door, a primary retainer, and a secondary retainer. The primary retainer is configured to extend through the aperture and engage with a periphery of the main portion. The secondary retainer is configured to extend through the aperture and to freely release through the aperture when the secondary retainer is disposed in the main portion allowing the clip to disconnect from the trim panel, and is configured to engage with the mount preventing release of the clip from the trim panel when the secondary retainer is disposed in the keyway.

20 Claims, 3 Drawing Sheets

CLIP FOR A VEHICLE DOOR ASSEMBLY

TECHNICAL FIELD

The present disclosure relates to vehicle door assemblies and more specifically to clips that retain a door trim panel to an inner panel of the door assembly.

BACKGROUND

Motor vehicles include door assemblies attached to the vehicle by one or more hinges. The door assemblies allow ingress and egress of a passenger cabin of the vehicle. Each door assembly includes a door that is typically formed of metal and a trim panel that is typically formed of plastic. The door includes an outer panel and an inner panel that are attached by a hemming process. A trim panel is attached to the inner panel of the door by retention features such as clips. The retention features must be releasable to allow a technician to remove the trim panel when servicing the door assembly.

SUMMARY

According to one embodiment, a vehicle door assembly includes a door and a trim panel. The trim panel has a mount defining an aperture with a main portion and a keyway. A clip of the assembly includes a base connected to the door, a primary retainer, and a secondary retainer. The primary retainer is configured to extend through the aperture and engage with a periphery of the main portion. The secondary retainer is configured to extend through the aperture and to freely release through the aperture when the secondary retainer is disposed in the main portion allowing the clip to disconnect from the trim panel, and is configured to engage with the mount preventing release of the clip from the trim panel when the secondary retainer is disposed in the keyway.

According to another embodiment, a door assembly includes a door and a trim panel having a mount defining an opening and a keyway. A clip of the door assembly is connected to the door and includes a primary retainer engaging the mount to secure the trim panel to the door and a secondary retainer extending through the mount and configured to be retractable through the mount when disposed in the opening and not retractable when disposed in the keyway.

According to yet another embodiment, a vehicle door assembly includes a door, a trim panel having a mounting surface defining an opening, and a clip connected to the door. The clip includes primary and secondary retainers receivable through the opening. The primary and secondary retainers are configured such that, when the door and trim panel are in a first position relative to each other, the primary retainer engages the mounting surface to retain the trim panel to the door and the secondary retainer is freely releasable through the opening, and such that when the door and trim panel are shifted relative to each other to a second position, the secondary retainer engages the mounting surface to retain the trim panel to the door.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
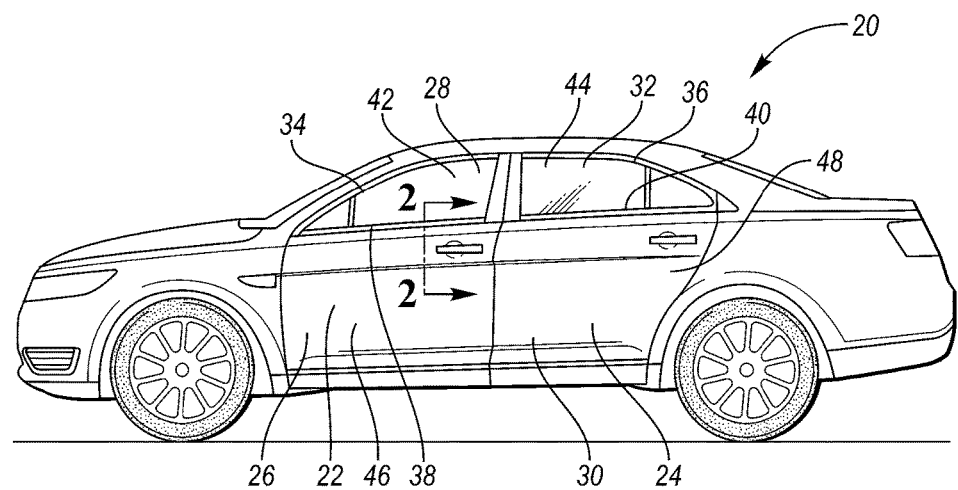
FIG. 1 is a side view of a vehicle having front and rear door assemblies.

FIG. 1 is a side view of a vehicle 20 having a front door assembly 22 and a rear door assembly 24. The front door assembly 22 has a lower portion 26 and an upper portion 28. The rear door assembly 24 has a lower portion 30 and an upper portion 32. The front and rear upper portions 28, 32 each define a window opening 34 and 36, respectively. A front beltline 38 generally divides the lower portion 26 and the upper portion 28, and a rear belt line 40 generally divides the lower portion 30 and the upper portion 32. The front door assembly 22 may include a glass window 42, and the rear door assembly 24 may also include a glass window 44.

The front door assembly 22 includes an outer panel 46 typically formed of metal, but may be formed of plastic, fiberglass, carbon fiber, or other suitable material. The outer panel 46 forms a class-A surface of the vehicle 20 and is typically painted and adorned with ornamental trim. The rear door assembly 24 also includes an outer panel 48 that may be similar to the front outer panel 46.

Various types of prior-art clips have been employed over the years to attach trim panels to doors. These clips are configured to release from the door or the trim panel allowing the trim panel to be removed from the door for service. When a door is impacted, such as during a collision, the impact can cause the door to deform from a normal position to a post-impact position. Deformation of the door can cause the trim panel to shift relative to the door placing stress on the clips. Many prior-art clips tend to release in response to deformation of the door allowing the trim panel to separate from the door. Retention features have been designed to retain the trim panel to the door during an impact, however, many of these features have substantially increased the difficulty of removing the trim panel from the door. This disclosure discloses a clip-and-mount arrangement that retains the trim panel to the door in the event of a collision without increasing the difficulty of removing the trim panel from the door when the door is in the normal position.

Figure 2:
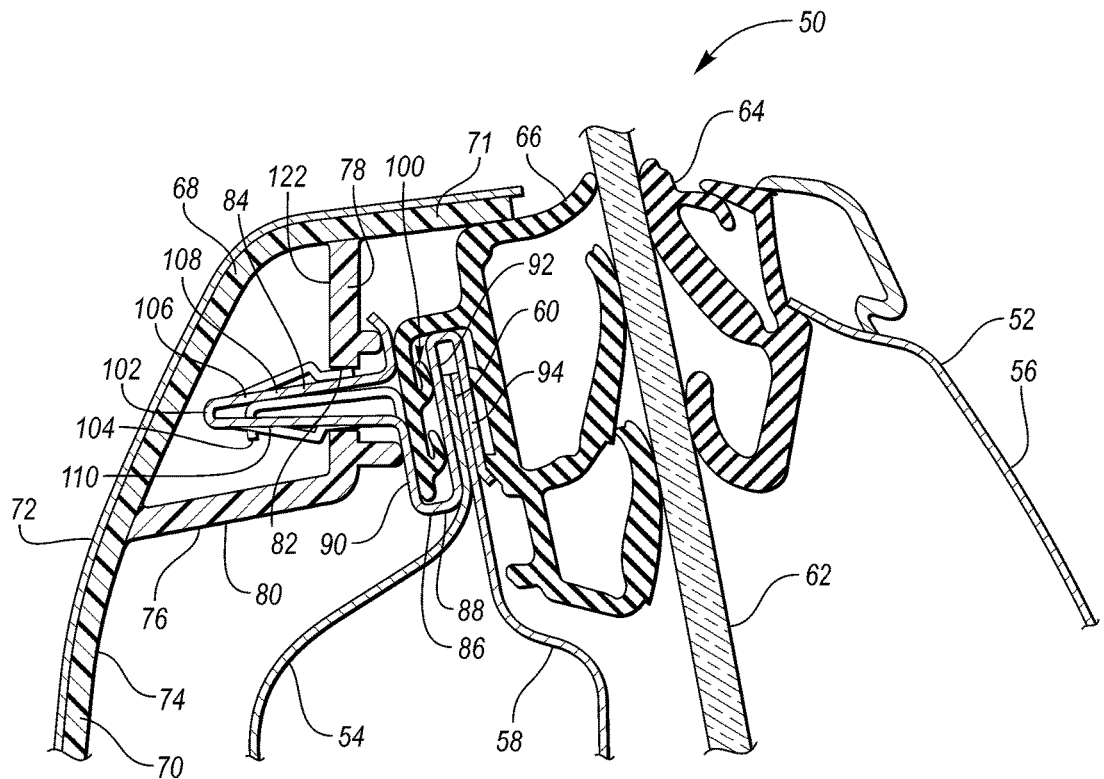
FIG. 2 is a partial side view, in cross section, of one of the doors of the vehicle at cut line 2-2.

Referring to FIG. 2, a door assembly 50, which may be used as a front door assembly and/or a rear door assembly on the vehicle 20, includes a door 52 having an inner panel 54, an outer panel 56, and a beltline reinforcement 58. The outer panel 56 forms the exterior, class-A surface of the door assembly 50 and the inner panel 54 is adjacent the passenger cabin of the vehicle 20. The reinforcement 58 is disposed between the inner and outer panels and is attached to the inner panel 54 along at least a beltline flange 60.

The inner panel 54 is spaced apart from the outer panel 56 to define a pocket configured to receive a window 62. A window regulator may be disposed within the door 52 and operable to raise and lower the window 62 relative to the door 52. An outer seal 64 is supported on the outer panel 56 and forms a seal between the window 62 and the outer panel 56. An inner seal 66 is supported on the beltline flange 60 and forms a seal between the window 62 and the inner panel 54.

A trim panel 68 is attached to the inner panel 54 of the door 52. The trim panel 68 is part of the passenger cabin and covers the door 52 to hide the inner components of the door and provide comfort features for occupants of the passenger cabin. The trim panel 68 may include a side portion 70 and a top portion 71 that extends outwardly from the side portion 70 near a beltline of the door assembly 50. An exterior surface 72 of the trim panel 68 faces the passenger cabin may include padding, trimming, and other aesthetic or comfort features for the passenger cabin. An interior surface 74 of the trim panel 68 faces the inner panel 54. One or more mounts 76 are disposed on the interior surface 74 and provide a connecting area for attaching the trim panel 68 to the door 52. The mount 76 may be a doghouse having a front wall 78, a bottom wall 80, and one or more sidewalls (not shown). The front wall 78 may be substantially vertical and adjacent to the beltline flange 60.

One or more clips 84 may be used to attach the trim panel 68 to the door 52. One end of the clip 84 may be attached to the door 52 and another end may be received within an opening 82 of the mount 76 to attach the trim panel 68 to the door 52. The door assembly 50 may include a plurality of mounts 76 and clips 84 positioned at various locations to attach the trim panel 68 to the door 52. The trim panel 68 and door 52 may also include other types of connection features that cooperate with the mount-and-clip pairs to fully secure the trim panel 68 to the door 52.

Figure 3:
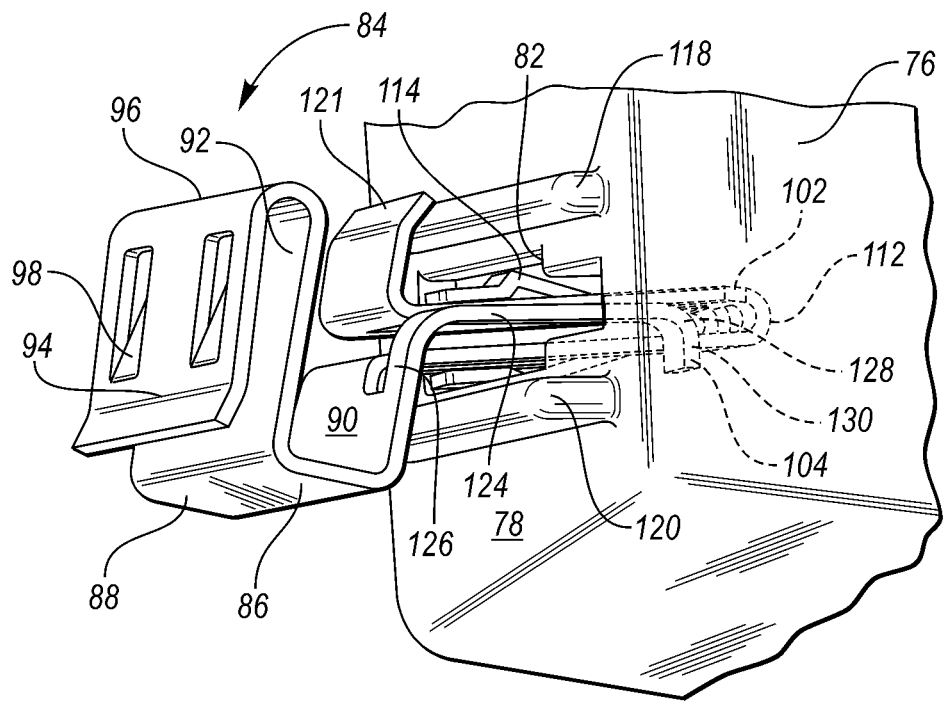
FIG. 3 is a perspective view of a backside of a door clip received in a mount of the door.
Figure 4:
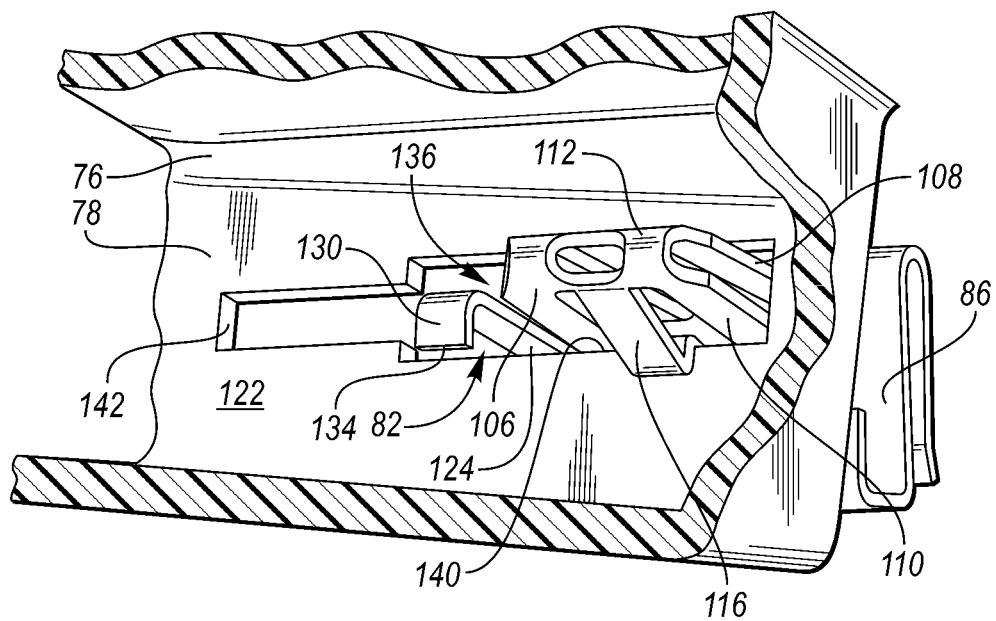
FIG. 4 is a perspective view of a front of the door clip received in the mount.

Referring to FIGS. 2, 3, and 4, the clip 84 may include a base 86 having a bottom 88, a front 90, and a back 92. A rear folded-over portion 94 of the base 86 is adjacent to the back 92 and defines a door connector 96 configured to be received on the beltline flange 60 to connect the clip 84 to the door 52. Barbs 98 may be provided on the folded over portion 94 to hold the clip in place. The clip 84 may include different types of bases allowing the clip to attach to other areas of the door. The front 90 and back 92 are spaced apart by the bottom 88 and cooperate to define a cavity 100. The inner seal 66 may be connected on the beltline flange 60 with a portion of the seal wrapping around the clip 84 and disposed within the cavity 100.

The clip 84 includes a primary retainer 102 and a secondary retainer 104 that are both received through the opening 82 to connect the trim panel 68 to the door 52. The primary retainer 102 is configured to secure the trim panel 68 to the door 52 when the door is in a normal position, and the secondary retainer 104 is configured to secure the trim panel 68 to the door 52 when the door has deformed due to an impact. The primary retainer 102 is also configured to not increase the difficulty of removing the trim panel 68 from the door 52, and the secondary retainer 104 is also configured to freely release through the opening 82 when the door is in the normal position.

The primary retainer 102 may include a U-shaped projection 106 connected to the front 90 and projecting outwardly therefrom in a direction that is generally perpendicular to the front 90. The U-shaped projection 106 may include an upper portion 108, a lower portion 110, and a bend portion 112 that interconnects the upper and lower portions and forms a tip of the projection 106. The U-shaped projection 106 is formed of a resilient material allowing the upper and lower portions 108, 110 to be compressed towards each other when acted upon by a force and to rebound away from each other when the force is removed. The upper portion 108 may include a retention barb 114 extending upwardly from the upper portion 108, and the lower portion 110 may include a retention barb 116 extending downwardly from the lower portion 110. The barbs 114, 116 are configured to engage with a backside 122 of the front wall 78 to secure the primary retainer 102 to the mount 76. Each of the barbs 114, 116 are formed of a resilient material and are compressible towards each other allowing the clip 84 to be removed through the opening 82. The projection 106 also includes a shoulder stop 121 located on the upper portion 108 and configured to engage with an upper projection 118 formed on the front wall 78 to prevent the clip 84 from advancing too far forward through the opening 82. A lower projection 120 is also formed on the front wall 78 and engages with the front 90 to limit insertion of the clip 84 past a predetermined position.

The secondary retainer 104 may include an elongate member 124 having a proximal end 126 connected to the front 90 and prosecuting outwardly to a distal end 128. The elongate member 124 may extend from the front 90 in the same direction as the U-shaped projection 106. The elongate member 124 may have a hooked end that grabs the backside 122 of the mount when the door has deformed due to an impact. For example, a locking tab 130 extends downwardly from the distal end 128 and terminates at a tip 134. The linear distance between the distal end 128 and the tip 134 may be referred to as the length of the locking tab. The locking tab 130 may be substantially perpendicular to the elongate member 124.

All of the components of the clip 84 may be integrally formed. For example, the clip 84 may be formed from a single piece of metal, such as steel, that is cut and bent into the geometry illustrated in the figures of this disclosure. Of course, the clip 84 may also be formed from multiple parts that are attached together, or may be formed from materials other than metal, such as plastic or rubber.

The primary retainer 102 and the secondary retainer 104 may be located adjacent to each other and spaced apart to define a gap 136. The gap 136 allows the primary retainer 102 and the secondary retainer 104 to be located within different portions of the opening 82.

Figure 5:
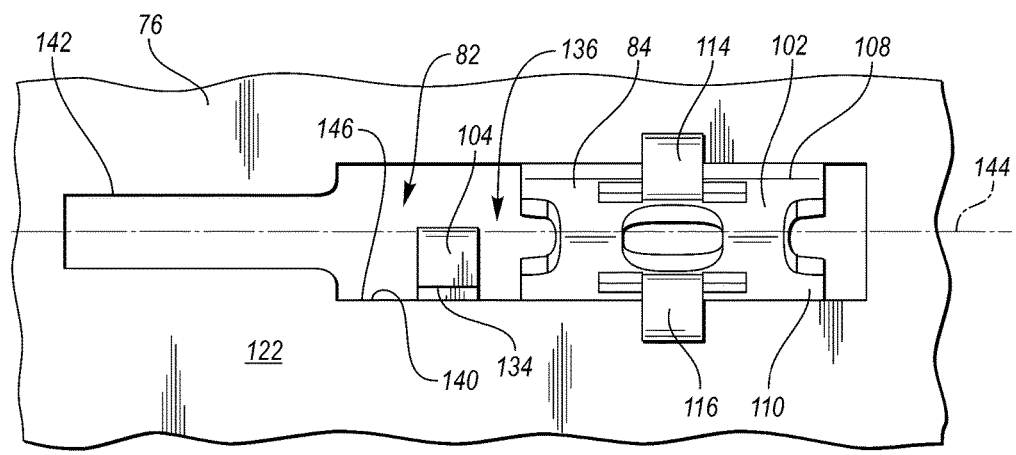
FIG. 5 is a front view of the door clip located in a normal position relative to the mount.

Referring to FIGS. 4 and 5, the opening 82 may include a main portion 140 and a keyway 142 that are continuous with each other to form a single opening. Alternatively, the opening 82 and the keyway 142 may be separate apertures that are located adjacent each other. The main portion 140 and the keyway 142 may both be slots that are elongated in the horizontal direction and are vertically centered on a common longitudinal centerline 144 of the opening 82. The main portion 140 may be larger than the keyway 142 in a width direction and/or in a vertical direction.

When the door 52 is in the normal position, the primary retainer 102 and the secondary retainer 104 are disposed in the main portion 140 of the opening 82 and the primary retainer secures the trim panel 68 to the mount 76. The main portion 140 is sized to snuggly fit the primary retainer 102 so that the barbs 114, 116 engage the mount 76. The upper and lower portions 108, 110, as well as the barbs 114, 116, may be compressed as the primary retainer 102 is inserted through the main portion 140. Once inserted, the upper and lower portions 108, 110 and the barbs 114, 116 expand to engage with the backside 122 to attach the clip 84 to the mount 76. The barbs 114, 116 may include reverse ramps that compress the barbs and the upper and lower portions when a pulling force is exerted on the clip 84 allowing the primary retainer 102 to be removed from the mount 76 thus enabling the trim panel 68 to be removed from the door 52.

When the door 52 is in the normal position, the secondary retainer 104 is configured to freely pass into and out of the main portion 140 when the clip 84 is inserted and removed from the opening 82. The main portion 140 is sized such that the tip 134 of the locking tab 130 is disposed within a periphery of the main portion 140 to prevent the periphery front wall 78 from contacting the secondary retainer 104. In the illustrated example, the distance between the centerline 144 and the bottom 146 of the main portion 140 is greater than the length of the locking tab 130 so that the tip 134 of the locking tab passes above the bottom 146 when the clip 84 is received into and out of the opening 82.

Figure 6:
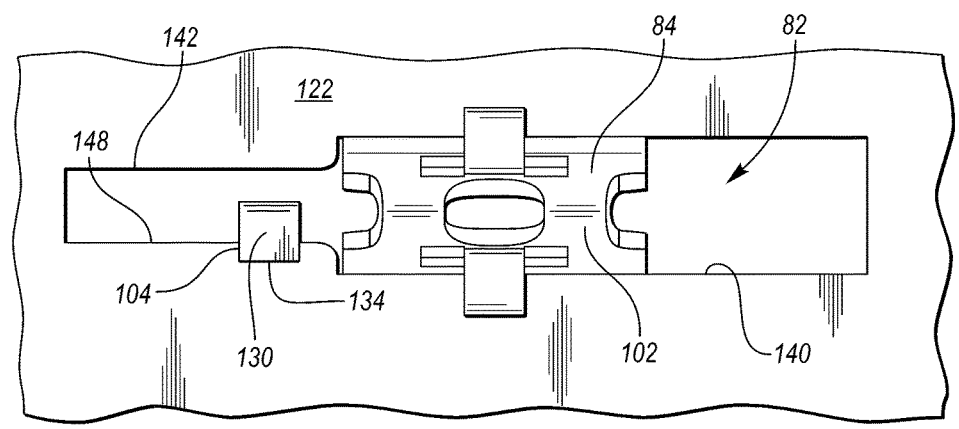
FIG. 6 is a front view of the door clip located in a post-impact position relative to the mount.

Referring to FIG. 6, the clip 84 is configured to slide within the opening 82 in response to deformation of the door 52. Deformation of the door 52 may slide the clip 84 towards the keyway 142 causing the secondary retainer 104 to move from its normal position in the main portion 140 to a post-impact position in the keyway 142. The deformation may also generate a pulling force on the clip 84 that would be sufficient to pull the clip 84 from the opening 82, but the secondary retainer 104 engages a periphery of the keyway 142 to prevent the clip 84 from being removed from the opening 82.

The locking tab 130 preventing the clip 84 from being removed from the opening 82 by engaging with the backside 122 proximate the keyway 142. The locking tab 130 may be sized to extend downwardly past a bottom 148 of the keyway 142 to prevent removal of the clip 84 from the mount 76. In one or more embodiments, the length of the locking tab 130 may be greater than or equal to the height of the keyway 142. While illustrated as a hooked end, the secondary retainer 104 may have any shape suitable to freely pass through the main portion 140 and to engage with the backside 122 when disposed in the keyway 142. For example, a planar member may be disposed on the distal end 128 and extend both upwardly and downwardly from the elongate member 124.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle door assembly comprising:
   a door;
   a trim panel including a mount defining an aperture having a main portion and a keyway; and
   a clip including:
      a base connected to the door,
      a primary retainer configured to extend through the aperture and engage with a periphery of the main portion, and
      a secondary retainer including an elongate member extending outwardly from the base and extendable through the aperture and a locking tab disposed on a distal end of the elongate member, the locking tab being configured to freely pass through the main portion allowing the clip to disconnect from the trim panel when the secondary retainer is disposed in the main portion and configured to engage with a back side of the mount when the elongate member is disposed in the keyway to prevent release of the clip from the trim panel.

2. The vehicle door assembly of claim 1, wherein the primary retainer and the secondary retainer are adjacent to each other.

3. The vehicle door assembly of claim 2, wherein the primary retainer and the secondary retainer are each connected to the base and project outwardly from the base in a same direction.

4. The vehicle door assembly of claim 2, wherein the primary retainer and the secondary retainer are spaced apart to define a gap.

5. The vehicle door assembly of claim 1, wherein the main portion and the keyway are slots each having a lateral dimension, and the lateral dimension of the main portion is greater than the lateral dimension of the keyway.

6. The vehicle door assembly of claim 5, wherein the secondary retainer includes a locking tab having a length that is greater than the lateral dimension of the keyway to prevent the secondary retainer from being removed from the keyway.

7. The vehicle door assembly of claim 5, wherein the main portion and the keyway have a common longitudinal centerline.

8. The vehicle door assembly of claim 1, wherein the mount is a doghouse formed on the trim panel and including at least a front wall and a bottom wall, wherein the front wall defines the aperture.

9. The vehicle door assembly of claim 1, wherein the door includes a beltline flange, and the base is attached to the beltline flange.

10. A door assembly comprising:
    a door;
    a trim panel including a mount defining an opening and a keyway; and a clip connected to the door and including a primary retainer engaging the mount to secure the trim panel to the door and a secondary retainer extending through the mount and having a locking tab configured to be retractable through the mount when disposed in the opening and not retractable when disposed in the keyway.

11. The door assembly of claim 10, wherein the opening and the keyway are continuous with each other to form a single aperture.

12. The door assembly of claim 11, wherein the opening and the keyway are side-by-side slots.

13. The door assembly of claim 10, wherein the opening and the keyway are centered about a common centerline.

14. The door assembly of claim 10, wherein the locking tab is configured to engage with a back side of the mount when the secondary retainer is disposed in the keyway to retain the trim panel to the door.

15. The door assembly of claim 14, wherein the keyway is a slot having a lateral dimension and the locking tab has a length that is greater than the lateral dimension of the keyway to prevent the secondary retainer from passing through the keyway.

16. The door assembly of claim 10, wherein the primary retainer includes resilient barbs engageable with a periphery of the opening.

17. A vehicle door assembly comprising:
a door;
a trim panel having a mounting surface defining an opening having a main portion and a keyway; and
a clip including a base connected to the door and primary and secondary elongate retainers each extending from the base to be receivable through the opening; wherein the primary and secondary retainers are configured such that, when the door and trim panel are in a first position relative to each other, the primary retainer engages the mounting surface to retain the trim panel to the door and the secondary retainer is freely releasable through the main portion, and such that, when the door and trim panel are shifted relative to each other to a second position in which the secondary retainer is disposed in the keyway, the secondary retainer engages the mounting surface to retain the trim panel to the door.

18. The vehicle door assembly of claim 17, wherein the secondary retainer includes a locking tab sized to pass through the opening when the door and trim panel are in the first position and sized to engage a back side of the mount preventing the clip from passing through the opening when the door and trim panel are in the second position.

19. The vehicle door assembly of claim 18, wherein the main portion and the keyway are continuous with each other and are both slot shaped, wherein the main portion and the keyway each has a lateral dimension, and wherein the lateral dimension of the main portion is greater than the lateral dimension of the keyway.

20. The vehicle door assembly of claim 19, wherein the secondary retainer includes a locking tab having a length that is less than the lateral dimension of the main portion and is greater than the lateral dimension of the keyway.

* * * * *